US012170428B2

(12) United States Patent
Lin

(10) Patent No.: US 12,170,428 B2
(45) Date of Patent: Dec. 17, 2024

(54) SMART SOCKET HAVING FUNCTION OF ELECTRIC LEAKAGE PROTECTION

(71) Applicant: WENZHOU HUAYA ELECTRIC CO., LTD, Leqing (CN)

(72) Inventor: Yunhua Lin, Leqing (CN)

(73) Assignee: WENZHOU HUAYA ELECTRIC CO., LTD, Leqing (CN)

( * ) Notice: Subject to any disclaimer, the term of this patent is extended or adjusted under 35 U.S.C. 154(b) by 379 days.

(21) Appl. No.: 17/826,170

(22) Filed: May 27, 2022

(65) Prior Publication Data

US 2022/0294165 A1 Sep. 15, 2022

(30) Foreign Application Priority Data

Dec. 17, 2021 (CN) ........................ 202123183788.9

(51) Int. Cl.
*H01R 13/10* (2006.01)
*H01R 13/11* (2006.01)
*H01R 13/502* (2006.01)
*H01R 13/713* (2006.01)
*H01R 24/78* (2011.01)

(52) U.S. Cl.
CPC ............. *H01R 24/78* (2013.01); *H01R 13/11* (2013.01); *H01R 13/502* (2013.01); *H01R 13/7135* (2013.01)

(58) Field of Classification Search
CPC ........ H01R 24/78; H01R 13/11; H01R 13/10; H01R 13/502; H01R 13/501; H01R 13/50; H01R 13/7135; H01R 13/713; H01R 13/71; H01R 13/46; H01R 13/44
USPC ........................................................ 439/92
See application file for complete search history.

(56) References Cited

U.S. PATENT DOCUMENTS

| | | | | | |
|---|---|---|---|---|---|
| 4,518,945 | A * | 5/1985 | Doyle | H01H 51/088 | 340/12.39 |
| 4,568,997 | A * | 2/1986 | Bienwald | H01H 73/44 | 361/45 |
| 7,271,987 | B1 * | 9/2007 | Zhang | H01H 83/14 | 335/26 |
| 8,297,990 | B2 * | 10/2012 | Huang | H02H 3/16 | 439/140 |
| 8,736,279 | B2 * | 5/2014 | Huang | H02H 3/16 | 361/42 |
| 8,858,245 | B2 * | 10/2014 | Huang | H02H 3/16 | 439/145 |

(Continued)

*Primary Examiner* — Harshad C Patel
(74) *Attorney, Agent, or Firm* — Hemisphere Law, PLLC; Zhigang Ma

(57) ABSTRACT

The present disclosure relates to a novel smart socket having a function of electric leakage protection. The novel smart socket includes an upper cover, a base and a middle-layer support, where a reset button is arranged on the upper cover; a tripping device is arranged on a circuit board and includes a tripper, a lock catch element and an electromagnetic assembly. The electromagnetic assembly includes a tripping iron core, a tripping spring and an accommodation frame, where an end of the tripping iron core is in linkage connection with the lock catch element; and one end of the lock catch element is in linkage connection with a linkage shaft and is located in the first cavity. The present disclosure simplifies an internal structure, and improves reliability of the novel smart socket having a function of electric leakage protection.

8 Claims, 5 Drawing Sheets

(56) References Cited

U.S. PATENT DOCUMENTS

| | | | | |
|---|---|---|---|---|
| 9,728,951 | B2 * | 8/2017 | Huang | H01R 25/006 |
| 10,319,550 | B2 * | 6/2019 | Huang | H01R 13/652 |
| 2006/0044086 | A1 * | 3/2006 | Wang | H01H 83/04 335/18 |
| 2007/0132530 | A1 * | 6/2007 | Wang | H01H 83/04 335/6 |
| 2010/0290163 | A1 * | 11/2010 | Li | H01H 83/04 361/42 |
| 2019/0123458 | A1 | 4/2019 | Azuma et al. | |
| 2020/0156220 | A1 | 5/2020 | Chou | |
| 2021/0126394 | A1 | 4/2021 | Hashimoto et al. | |

* cited by examiner

SMART SOCKET HAVING FUNCTION OF ELECTRIC LEAKAGE PROTECTION

TECHNICAL FIELD

The present disclosure relates to the technical field of sockets, and in particular to a novel smart socket having a function of electric leakage protection.

BACKGROUND

With the continuous development of the industry of the novel smart socket having a function of electric leakage protection, requirements on the use safety and the service life of the novel smart socket having a function of electric leakage protection are increasingly higher, and it is expected that in the use process of the novel smart socket having a function of electric leakage protection, when its service life ends, that is, its internal components fail and lose the function of electric leakage protection, a user can be reminded of replacing a new novel smart socket having a function of electric leakage protection in time. Moreover, it is also expected to achieve longer service life of the novel smart socket having a function of electric leakage protection, which proves that the novel smart socket having a function of electric leakage protection works stably and has excellent safety and reliability from another aspect. However, an existing novel smart socket having a function of electric leakage protection has a complex internal structure, which is inconducive to maintenance and repair.

SUMMARY

The objective of the present disclosure is to provide a novel smart socket having a function of electric leakage protection, which simplifies an internal structure and improves reliability of the novel smart socket having a function of electric leakage protection.

In order to achieve the above objective, the present disclosure provides the following technical solution:

a novel smart socket having a function of electric leakage protection includes an upper cover, a base and a middle-layer support, where a reset button is arranged on the upper cover, one end of the reset button is connected to a linkage shaft, metal conducting strips are arranged on the middle-layer support, a circuit board is arranged in the base, and a tripping device is arranged on the circuit board and includes a tripper, a lock catch element and an electromagnetic assembly, where the tripper includes a first cavity and second cavities located on two sides of the first cavity, where the first cavity and the second cavities are integrally formed, a first opening in communication with the first cavity is provided at an upper end surface of the first cavity, second openings are provided at a first side surface and a second side surface of the first cavity, the second openings are in communication with the first cavity, clamping openings are provided at upper end surfaces of the second cavities, and conduction pieces are arranged in the clamping openings and make contact with or are disconnected from the metal conducting strips; the electromagnetic assembly includes a tripping iron core, a tripping spring and an accommodation frame, where an end of the tripping iron core is in linkage connection with the lock catch element; and one end of the lock catch element is in linkage connection with the linkage shaft and is located in the first cavity.

Further, a first linkage hole and a second linkage hole are formed on the lock catch element, the first linkage hole is provided close to one side of the tripping iron core, the second linkage hole is provided close to one side of the linkage shaft, a clamping block is arranged on the linkage shaft, and moves back and forth from the second linkage hole along with the linkage shaft, the end of the tripping iron core moves back and forth in the first linkage hole, a size of the second linkage hole is reduced in a first direction, and a maximum diameter of the clamping block is greater than a minimum inner diameter in the second linkage hole.

Further, a magnetic ring assembly is further arranged on the circuit board, a contact piece is arranged at a top of the magnetic ring assembly, one end of the contact piece penetrates the magnetic ring assembly to be electrically connected to the circuit board, and the other end of the contact piece is electrically connected to the conduction pieces.

Further, a guide jack is provided at a position on the base corresponding to the linkage shaft.

Further, wiring holes are provided on two side surfaces of the base, wiring terminals are arranged in the wiring holes, terminal screws are arranged on the wiring terminals, and outer side surfaces of the wiring terminals and side surfaces in which the wiring holes are located are located in the same horizontal plane.

Further, plug holes and an indicator lamp hole are provided on the upper cover.

Further, buckle blocks are arranged on two side surfaces of the base, hanging buckles are correspondingly arranged on the upper cover, a hanging buckle cavity is formed in the hanging buckles, and the base is fixedly connected to the upper cover by means of matching of the hanging buckle cavity and the buckle blocks.

Further, a monitoring protection circuit is arranged on the circuit board, and internally includes an electric leakage protection chip U1 and a microprocessor chip U2, where a pin 1 and a pin 3 of the electric leakage protection chip U1 are connected to a pin 1 and a pin 2 of an electric leakage magnetic ring L1 respectively, the electric leakage magnetic ring L1 is arranged between a live wire L and a null wire N, a pin 4 of the electric leakage protection chip U1 is connected to a capacitor C9 in series to be connected to two ends of a series resistor R30 and a voltage stabilizing diode Z1, the series resistor R30 is connected to a pin 3 of a rectifier diode ZL1, the voltage stabilizing diode Z1 is connected to a capacitor C3, a capacitor C7 and a resistor R5 which are connected in parallel to be connected to a pin 4 of the rectifier diode ZL1, a pin 5 of the electric leakage protection chip U1 is connected to a resistor R9, a resistor R29 and the capacitor C3 separately, the resistor R9 is connected to a base electrode of a triode Q1, a collector electrode of the triode Q1 is connected to a resistor R10 in series to be connected to a 5 V voltage, the resistor R29 is connected to a collector electrode of a triode Q6, a base electrode of the triode Q6 is connected to a resistor R27 and a resistor R28 which are connected in series, one end of the resistor R27 and the resistor R28 which are connected in series is connected to the 5 V voltage, the other end of the resistor R27 and the resistor R28 which are connected in series is connected to a diode D5 in series to be connected to a thyristor K2 and a thyristor K3 which are connected in series, the thyristor K2 is connected to a coil L3, the coil L3 is connected to a fuse F1 in series to be connected to the live wire L, the capacitor C3 is connected to a circuit interface of a switch S2, a pin 6 of the electric leakage protection chip U1 is connected to a 25 V-26 V voltage and a resistor R3, and the resistor R3 is connected to a diode D2 in series to be connected to the thyristor K2 and the thyristor K3 which are connected in series; and a pin 2 of the microprocessor chip U2 is connected to a resistor R12 in series to be connected to a base electrode of a triode Q2, an emitter electrode of the triode Q2 is connected to the 5 V voltage, a collector electrode of the triode Q2 is connected to a resistor R14 and a resistor R15 in series to be connected to a thyristor K1, the thyristor K1 is connected to a resistor R16 in series to be connected to a load LD, a pin 6 of the microprocessor chip U2 is connected to a resistor R17 in series to be connected to a base electrode of a triode Q3, an emitter electrode of the triode Q3 is connected to a resistor R18 and a capacitor C11 which are connected in parallel to be connected to the 5 V voltage, a collector electrode of the triode Q3 is connected to a resistor R19 and a resistor R20 in series to be connected to the switch S2, the switch S2 is connected to a resistor R7 and a resistor R8 in series to be connected to the 5 V voltage and a resistor R6, the resistor R6 is connected to a light-emitting diode D3 and a light-emitting diode D4 separately, a pin 7 of the microprocessor chip U2 is connected to a resistor R21 in series to be connected to a base electrode of a triode Q4, an emitter electrode of the triode Q4 is connected to the 5 V voltage, a collector electrode of the triode Q4 is connected to a resistor R25 and a resistor R26 in series to be connected to a base electrode of a triode Q5, a collector electrode of the triode Q5 is connected to a resistor R23, and the resistor R23 is connected to two ends of the thyristor K2 in parallel.

The present disclosure has the beneficial effects: hanging is carried out under the condition of deenergization, the reset button is in a natural state, one end of the linkage shaft is located in the second linkage hole of the lock catch element and does not make contact with the second linkage hole, the linkage shaft moves towards a direction of the base under an action force after the reset button is pressed, and the clamping block moves downwards at the same time until the clamping block acts on an inner wall of the second linkage hole, such that the second linkage hole reversely moves towards the first direction for a short distance until the clamping block completely enters a position below the second linkage hole, and in such a case, due to existence of the tripping iron core and the tripping spring, the lock catch element reversely moves towards the first direction, such that the clamping block may not move upwards from the second linkage hole, and in such a case, sliding may not be caused when the reset button is released; and when the reset button is pulled up, the whole lock catch element is pulled to move upwards to drive the tripper to move upwards, and in such a case, the two conduction pieces located on the second cavities move towards one sides of the metal conducting strips, thereby achieving electric power conduction; in this way, hanging operation is achieved under the condition of deenergization, thereby being safer and more reliable; and in addition, during electric leakage protection, a test button is pressed, or during electric leakage, a circuit detects an electric leakage signal, then the tripping coil is energized, and the tripping iron core starts to act, so as to pull the lock catch element, such that the lock catch element is separated from the clamping block, and in such a case, the tripper descends, such that the conduction pieces are separated from the metal conducting strips to disconnect connection.

BRIEF DESCRIPTION OF DRAWINGS

The drawings described herein serve to provide a further understanding of the present application and form a part hereof, and the illustrative embodiments of the present application and the description of the illustrative embodiments serve to explain the present application and are not to be construed as unduly limiting the present application. In the drawings.

Figure 1:
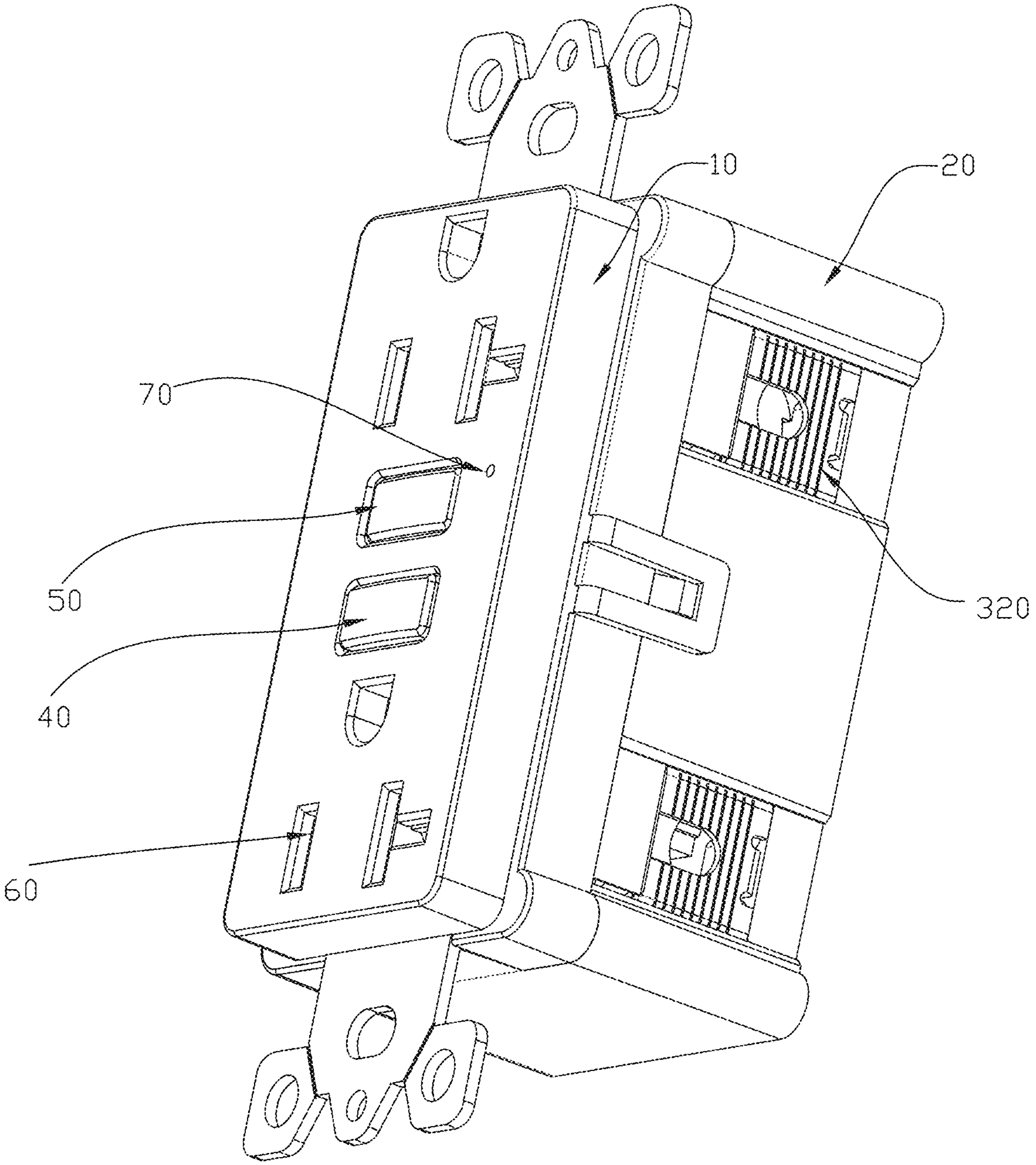
FIG. 1 is a stereogram of an embodiment of the present disclosure.
Figure 2:
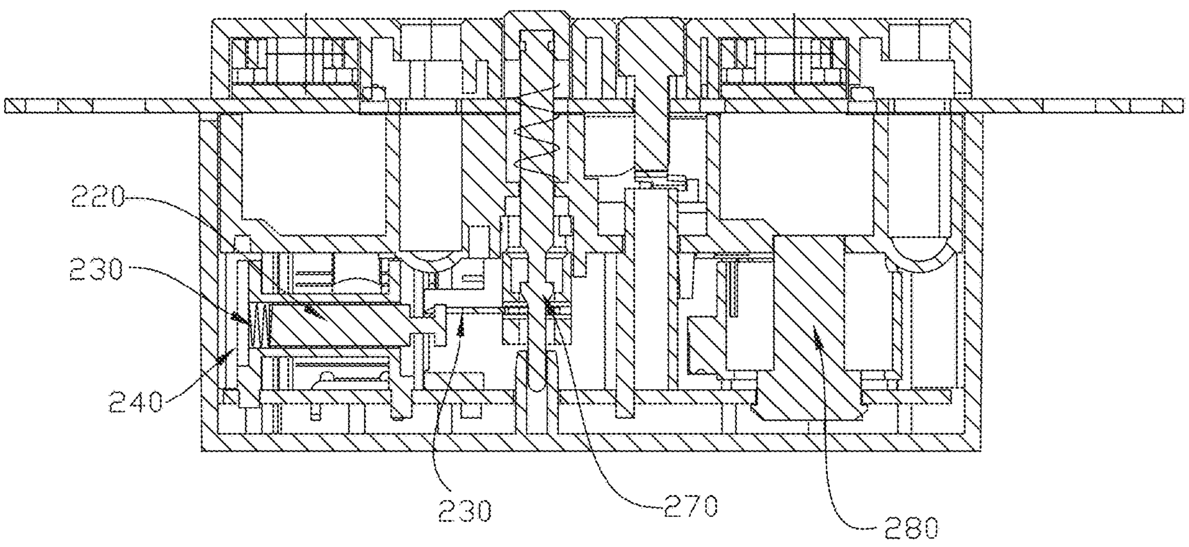
FIG. 2 is a cutaway view of an embodiment of the present disclosure.
Figure 3:
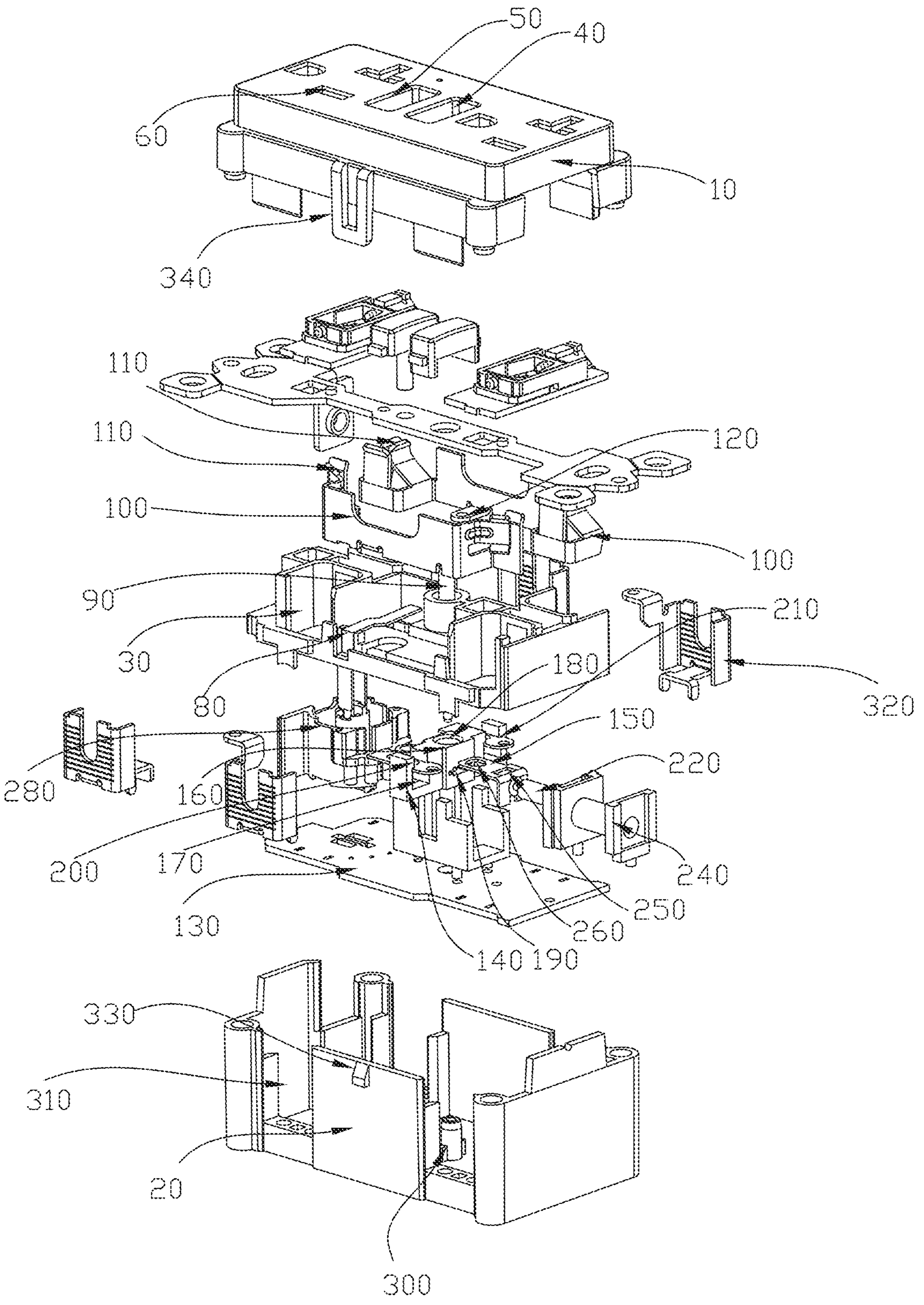
FIG. 3 is an exploded schematic diagram of an embodiment of the present disclosure.
Figure 4:
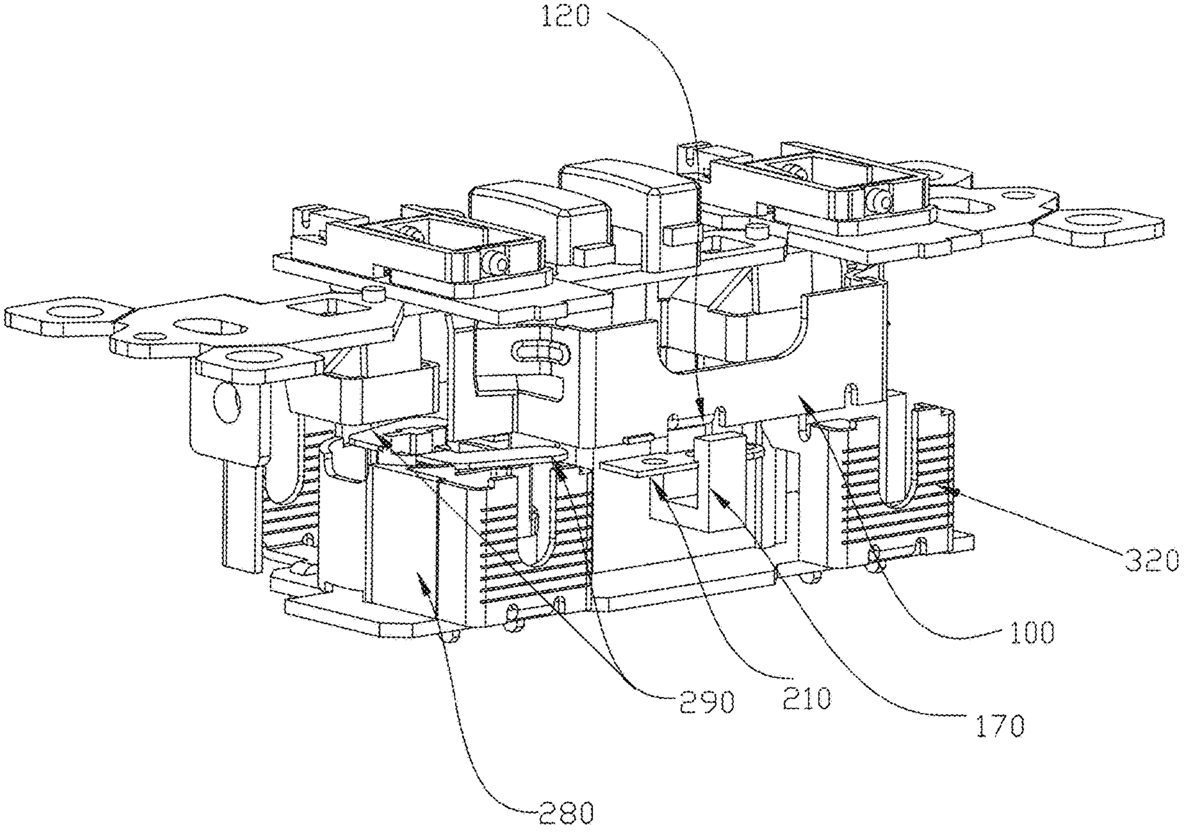
FIG. 4 is a partial schematic diagram of an embodiment of the present disclosure.

Reference numerals: 10, upper cover; 20, base; 30, middle-layer support; 40, reset button; 50, test button; 60, plug hole; 70, indicator lamp hole; 80, test piece; 90, linkage shaft; 100, metal conducting strip; 110, connection end; 120, contact end; 130, circuit board; 140, tripper; 150, lock catch element; 160, first cavity; 170, second cavity; 180, first opening; 190, second opening; 200, clamping opening; 210, conduction piece; 220, tripping iron core; 230, tripping spring; 240, accommodation frame; 250, first linkage hole; 260, second linkage hole; 270, clamping block; 280, magnetic ring assembly; 290, contact piece; 300, guide jack; 310, wiring hole; 320, wiring terminal; 330, buckle block; and 340, hanging buckle.

DETAILED DESCRIPTION OF THE EMBODIMENTS

The implementation of the present application will be described in detail below with reference to the accompanying drawings and embodiments, such that an implementation process of how the present application applies technical means to solve the technical problem and achieve technical effects may be fully understood and implemented.

As shown in FIGS. 1-4, the present disclosure uses the following technical solution:

the present disclosure relates to a novel smart socket having a function of electric leakage protection. The novel smart socket includes an upper cover 10, a base 20 and a middle-layer support 30, where a reset button 40 and a test button 50 are arranged on the upper cover 10, plug holes 60 and an indicator lamp hole 70 are further provided on the upper cover at the same time, a test piece 80 is arranged below the test button 50, one end of the reset button 40 is connected to a linkage shaft 90, metal conducting strips 100 are arranged on the middle-layer support 30, the metal conducting strips 100 are symmetrically arranged on the middle-layer support 30, connection ends 110 are formed at two ends of each of the metal conducting strips 100, the connection ends 110 are located below the plug holes 60 and are used for being connected to an external device, and in addition, contact ends 120 are further arranged on the metal conducting strips 100.

A circuit board 130 is arranged in the base 20, and a tripping device is arranged on the circuit board 130 and includes a tripper 140, a lock catch element 150 and an electromagnetic assembly, where the tripper 140 includes a first cavity 160 and second cavities 170 located on two sides of the first cavity 160, where the first cavity and the second cavities are integrally formed, a first opening 180 in communication with the first cavity 160 is provided at an upper end surface of the first cavity 160, second openings 190 are provided at a first side surface and a second side surface of the first cavity 160, the second openings 190 are in communication with the first cavity 160, clamping openings 200 are provided at upper end surfaces of the second cavities 170, conduction pieces 210 are arranged in the clamping openings 200, and the conduction pieces 210 make contact with or are disconnected from the metal conducting strips 100; the electromagnetic assembly includes a tripping iron core 220, a tripping spring 230 and an accommodation frame 240, where the tripping iron core 220 and the tripping spring 230 are arranged in the accommodation frame 240, an end of the tripping iron core 220 is in linkage connection with the lock catch element 150; and one end of the lock catch element 150 is in linkage connection with the linkage shaft 90 and is located in the first cavity 160.

A first linkage hole 250 and a second linkage hole 260 are provided on the lock catch element 150, the first linkage hole 250 is provided close to one side of the tripping iron core 220, the second linkage hole 260 is provided close to one side of the linkage shaft 90, a clamping block 270 is arranged on the linkage shaft 90, the clamping block 270 moves back and forth from the second linkage hole 260 along with the linkage shaft 90, the end of the tripping iron core 220 moves back and forth in the first linkage hole 250, a size of the second linkage hole 260 is reduced in a first direction, and a maximum diameter of the clamping block 270 is greater than a minimum inner diameter in the second linkage hole 260.

A magnetic ring assembly 280 is further arranged on the circuit board 130, a contact piece 290 is arranged at a top of the magnetic ring assembly 280, one end of the contact piece 290 penetrates the magnetic ring assembly 280 to be electrically connected to the circuit board 130, and the other end of the contact piece is electrically connected to the conduction pieces 210, while in the prior art, a contact piece is an elastic piece and directly extends to a position below a metal conducting strip, and then conduction is achieved by means of the effect of a linkage shaft and a tripper, such that the elastic piece has an extremely long length, and is easy to damage due to elasticity, and in this embodiment, a length of the contact piece is shortened, the contact piece is firstly connected to the conduction pieces by means of flexible connection or other connection modes, and then the conduction pieces are driven to be connected to the metal conducting pieces by means of the tripper, such that the problem of inconvenient assembly caused by the overlong elastic piece is avoided, the structure is more reasonable, and in addition, the problem of easy damage of the elastic piece due to elasticity is avoided, and elasticity is reduced due to long-term collision, such that a contact effect is reduced; and a guide jack 300 is provided at a position on the base 20 corresponding to the linkage shaft 90. By means of the guide jack 300, the linkage shaft 90 is more stable when moving, and reliability is improved when the linkage shaft is in a fixed state.

In addition, when an existing socket is wired, side surfaces of two sides of each of wiring holes 310 extend outwards, such that the socket has a poor wiring effect when terminal screws are connected, and therefore, in the present disclosure, wiring holes 310 are provided on two side surfaces of the base 20, wiring terminals 320 are arranged in the wiring holes 310, terminal screws are arranged on the wiring terminals 320, and outer side surfaces A of the wiring terminals 320 and side surfaces B in which the wiring holes 310 are located are located in the same horizontal plane.

Buckle blocks 330 are arranged on two side surfaces of the base, hanging buckles 340 are correspondingly arranged on the upper cover, a hanging buckle cavity is formed in the hanging buckles, and the base is fixedly connected to the upper cover by means of matching of the hanging buckle cavity and the buckle blocks 330.

Figure 5:
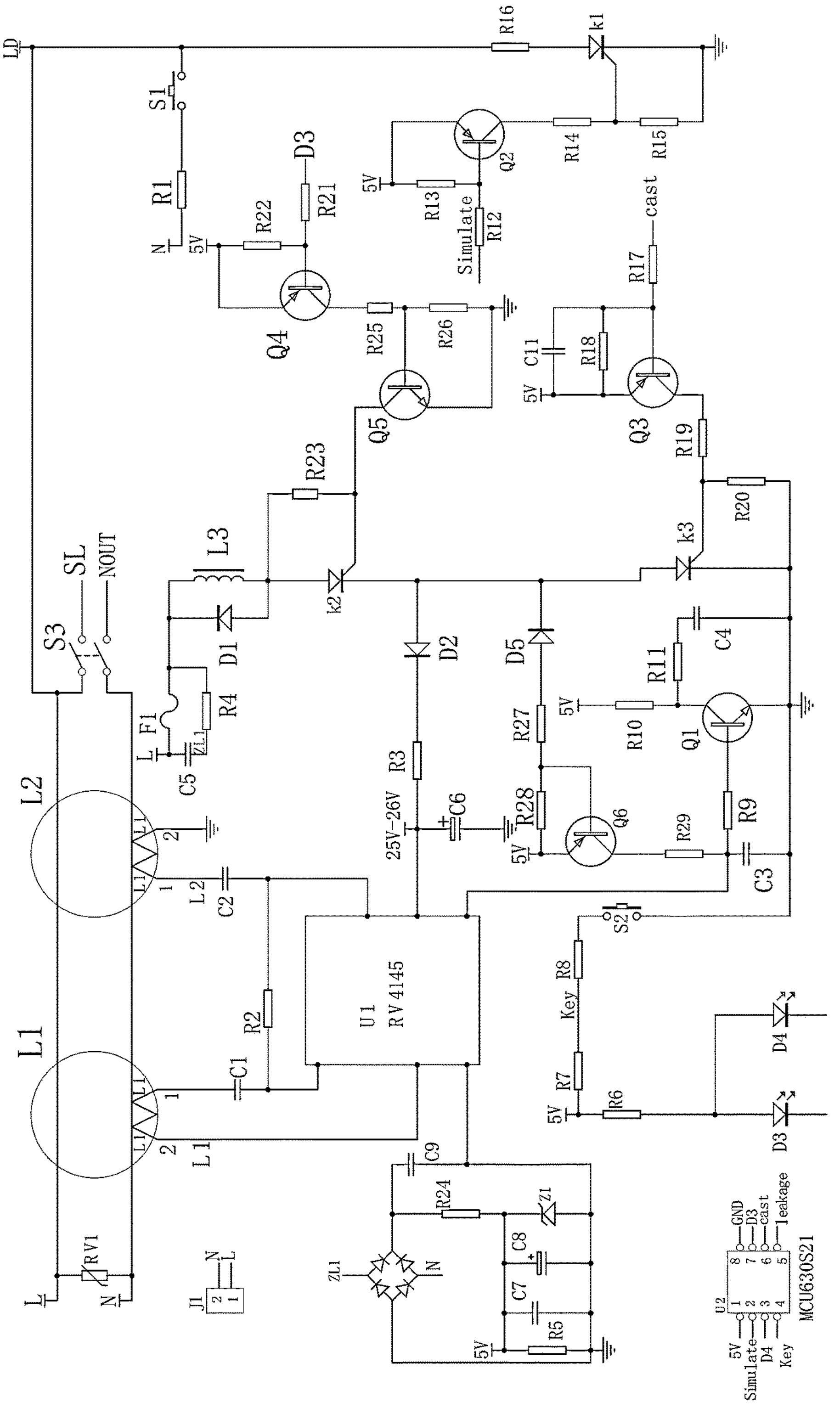
FIG. 5 is a schematic diagram of a monitoring protection circuit of an embodiment of the present disclosure.

In addition, the present disclosure further provides a monitoring circuit protection circuit for an operation fault of a ground fault leakage protector. As shown in FIG. 5, the monitoring circuit protection circuit includes a circuit board 130, where a monitoring protection circuit is arranged on the circuit board, and internally includes an electric leakage protection chip U1 and a microprocessor chip U2, where a pin 1 and a pin 3 of the electric leakage protection chip U1 are connected to a pin 1 and a pin 2 of an electric leakage magnetic ring L1 respectively, the electric leakage magnetic ring L1 is arranged between a live wire L and a null wire N, a pin 4 of the electric leakage protection chip U1 is connected to a capacitor C9 in series to be connected to two ends of a series resistor R30 and a voltage stabilizing diode Z1, the series resistor R30 is connected to a pin 3 of a rectifier diode ZL1, the voltage stabilizing diode Z1 is connected to a capacitor C3, a capacitor C7 and a resistor R5 which are connected in parallel to be connected to a pin 4 of the rectifier diode ZL1, a pin 5 of the electric leakage protection chip U1 is connected to a resistor R9, a resistor R29 and the capacitor C3 separately, the resistor R9 is connected to a base electrode of a triode Q1, a collector electrode of the triode Q1 is connected to a resistor R10 in series to be connected to a 5 V voltage, the resistor R29 is connected to a collector electrode of a triode Q6, a base electrode of the triode Q6 is connected to a resistor R27 and a resistor R28 which are connected in series, one end of the resistor R27 and the resistor R28 which are connected in series is connected to the 5 V voltage, the other end of the resistor R27 and the resistor R28 which are connected in series is connected to a diode D5 in series to be connected to a thyristor K2 and a thyristor K3 which are connected in series, the thyristor K2 is connected to a coil L3, the coil L3 is connected to a fuse F1 in series to be connected to the live wire L, the capacitor C3 is connected to a circuit interface of a switch S2, a pin 6 of the electric leakage protection chip U1 is connected to a 25 V-26 V voltage and a resistor R3, and the resistor R3 is connected to a diode D2 in series to be connected to the thyristor K2 and the thyristor K3 which are connected in series; and a pin 2 of the microprocessor chip U2 is connected to a resistor R12 in series to be connected to a base electrode of a triode Q2, an emitter electrode of the triode Q2 is connected to the 5 V voltage, a collector electrode of the triode Q2 is connected to a resistor R14 and a resistor R15 in series to be connected to a thyristor K1, the thyristor K1 is connected to a resistor R16 in series to be connected to a load LD, a pin 6 of the microprocessor chip U2 is connected to a resistor R17 in series to be connected to a base electrode of a triode Q3, an emitter electrode of the triode Q3 is connected to a resistor R18 and a capacitor C11 which are connected in parallel to be connected to the 5 V voltage, a collector electrode of the triode Q3 is connected to a resistor R19 and a resistor R20 in series to be connected to the switch S2, the switch S2 is connected to a resistor R7 and a resistor R8 in series to be connected to the 5 V voltage and a resistor R6, the resistor R6 is connected to a light-emitting diode D3 and a light-emitting diode D4 separately, a pin 7 of the microprocessor chip U2 is connected to a resistor R21 in series to be connected to a base electrode of a triode Q4, an emitter electrode of the triode Q4 is connected to the 5 V voltage, a collector electrode of the triode Q4 is connected to a resistor R25 and a resistor R26 in series to be connected to a base electrode of a triode Q5, a collector electrode of the triode Q5 is connected to a resistor R23, and the resistor R23 is connected to two ends of the thyristor K2 in parallel.

The working principle and effect of the present disclosure are as follows: hanging is carried out under the condition of deenergization, the reset button 40 is in a natural state, one end of the linkage shaft 90 is located in the second linkage hole 260 of the lock catch element and does not make contact with the second linkage hole, the linkage shaft 90 moves towards a direction of the base 20 under an action force after the reset button 40 is pressed, and the clamping block 270 moves downwards at the same time until the clamping block 270 acts on an inner wall of the second linkage hole 260, such that the second linkage hole 260 reversely moves towards the first direction for a short distance until the clamping block 270 completely enters a position below the second linkage hole 260, and in such a case, due to existence of the tripping iron core 220 and the tripping spring 230, the lock catch element reversely moves towards the first direction, such that the clamping block 270 may not move upwards from the second linkage hole 260, and in such a case, sliding may not be caused when the reset button 40 is released; and when the reset button 40 is pulled up, the whole lock catch element 150 is pulled to move upwards to drive the tripper 140 to move upwards, and in such a case, the two conduction pieces 210 located on the second cavities 170 move towards one sides of the metal conducting strips 100, thereby achieving electric power conduction; in this way, hanging operation is achieved under the condition of deenergization, thereby being safer and more reliable; and in addition, during electric leakage protection, the test button 50 is pressed, or during electric leakage, a circuit detects an electric leakage signal, then the tripping coil is energized, and the tripping iron core 220 starts to act, so as to pull the lock catch element 150, such that the lock catch element is separated from the clamping block 270, and in such a case, the tripper 140 descends, such that the conduction pieces 210 are separated from the metal conducting strips 100 to disconnect connection.

Certain words may be used throughout the description and claims to refer to particular assemblies. It will be appreciated by those skilled in the art that hardware manufacturers may refer to the same assembly with different nouns. The description and claims do not take differences in names as a way to distinguish assemblies, but rather take differences in function of assemblies as a criterion for distinguishing. "Contain" as mentioned throughout the description and claims is an open-ended term and thus, should be interpreted to mean "contain, but not limited to". "Approximately" means that within an acceptable error range, those skilled in the art are able to solve the technical problem within a certain error range to basically achieve the technical effect.

It should be noted that, terms "include", "contain", or any other variations thereof are intended to cover non-exclusive inclusions, such that commodities or systems including a series of elements not only include those elements, but also include other elements that are not explicitly listed, or further includes inherent elements of the commodities or the systems. Without more restrictions, the elements defined by the sentence "includes a . . . " do not exclude the existence of other identical elements in the commodities or systems including the elements.

What is described above shows and describes several preferred embodiments of the present disclosure, but as previously described, it should be understood that the present disclosure is not limited to the form disclosed herein, is not to be considered exclusive of other embodiments, and may be used in various other combinations, modifications and environments, and is modified by means of the above teachings or skill or knowledge in the related field within the scope of the inventive creation described herein. Modifications and changes made by those skilled in the art without departing from the spirit and scope of the present disclosure should all fall within the scope of protection of the appended claims of the present disclosure.

What is claimed is:

1. A novel smart socket having a function of electric leakage protection, comprising an upper cover, a base and a middle-layer support, wherein a reset button is arranged on the upper cover, one end of the reset button is connected to a linkage shaft, metal conducting strips are arranged on the middle-layer support, a circuit board is arranged in the base, and a tripping device is arranged on the circuit board and comprises a tripper, a lock catch element and an electromagnetic assembly, wherein the tripper comprises a first cavity and second cavities located on two sides of the first cavity, wherein the first cavity and the second cavities are integrally formed, a first opening in communication with the first cavity is provided at an upper end surface of the first cavity, second openings are provided at a first side surface and a second side surface of the first cavity, the second openings are in communication with the first cavity, clamping openings are provided at upper end surfaces of the second cavities, and conduction pieces are arranged in the clamping openings and make contact with or are disconnected from the metal conducting strips; the electromagnetic assembly comprises a tripping iron core, a tripping spring and an accommodation frame, wherein an end of the tripping iron core is in linkage connection with the lock catch element; and one end of the lock catch element is in linkage connection with the linkage shaft and is located in the first cavity.

2. The novel smart socket having a function of electric leakage protection according to claim 1, wherein a first linkage hole and a second linkage hole are formed on the lock catch element, the first linkage hole is provided close to one side of the tripping iron core, the second linkage hole is provided close to one side of the linkage shaft, a clamping block is arranged on the linkage shaft, and moves back and forth from the second linkage hole along with the linkage shaft, the end of the tripping iron core moves back and forth in the first linkage hole, a size of the second linkage hole is reduced in a first direction, and a maximum diameter of the clamping block is greater than a minimum inner diameter in the second linkage hole.

3. The novel smart socket having a function of electric leakage protection according to claim 2, wherein a magnetic ring assembly is further arranged on the circuit board, a contact piece is arranged at a top of the magnetic ring assembly, one end of the contact piece penetrates the magnetic ring assembly to be electrically connected to the circuit board, and the other end of the contact piece is electrically connected to the conduction pieces.

4. The novel smart socket having a function of electric leakage protection according to claim 3, wherein a guide jack is provided at a position on the base corresponding to the linkage shaft.

5. The novel smart socket having a function of electric leakage protection according to claim 4, wherein wiring holes are provided on two side surfaces of the base, wiring terminals are arranged in the wiring holes, terminal screws are arranged on the wiring terminals, and outer side surfaces of the wiring terminals and side surfaces in which the wiring holes are located are located in the same horizontal plane.

6. The novel smart socket having a function of electric leakage protection according to claim 5, wherein plug holes and an indicator lamp hole are provided on the upper cover.

7. The novel smart socket having a function of electric leakage protection according to claim 6, wherein buckle blocks are arranged on two side surfaces of the base, hanging buckles are correspondingly arranged on the upper cover, a hanging buckle cavity is formed in the hanging buckles, and the base is fixedly connected to the upper cover by means of matching of the hanging buckle cavity and the buckle blocks.

8. The novel smart socket having a function of electric leakage protection according to claim 6, wherein a monitoring protection circuit is arranged on the circuit board, and internally comprises an electric leakage protection chip U1 and a microprocessor chip U2, wherein a pin 1 and a pin 3 of the electric leakage protection chip U1 are connected to a pin 1 and a pin 2 of an electric leakage magnetic ring L1 respectively, the electric leakage magnetic ring L1 is arranged between a live wire L and a null wire N, a pin 4 of the electric leakage protection chip U1 is connected to a capacitor C9 in series to be connected to two ends of a series resistor R30 and a voltage stabilizing diode Z1, the series resistor R30 is connected to a pin 3 of a rectifier diode ZL1, the voltage stabilizing diode Z1 is connected to a capacitor C3, a capacitor C7 and a resistor R5 which are connected in parallel to be connected to a pin 4 of the rectifier diode ZL1, a pin 5 of the electric leakage protection chip U1 is connected to a resistor R9, a resistor R29 and the capacitor C3 separately, the resistor R9 is connected to a base electrode of a triode Q1, a collector electrode of the triode Q1 is connected to a resistor R10 in series to be connected to a 5 V voltage, the resistor R29 is connected to a collector electrode of a triode Q6, a base electrode of the triode Q6 is connected to a resistor R27 and a resistor R28 which are connected in series, one end of the resistor R27 and the resistor R28 which are connected in series is connected to the 5 V voltage, the other end of the resistor R27 and the resistor R28 which are connected in series is connected to a diode D5 in series to be connected to a thyristor K2 and a thyristor K3 which are connected in series, the thyristor K2 is connected to a coil L3, the coil L3 is connected to a fuse F1 in series to be connected to the live wire L, the capacitor C3 is connected to a circuit interface of a switch S2, a pin 6 of the electric leakage protection chip U1 is connected to a 25 V-26 V voltage and a resistor R3, and the resistor R3 is connected to a diode D2 in series to be connected to the thyristor K2 and the thyristor K3 which are connected in series; and a pin 2 of the microprocessor chip U2 is connected to a resistor R12 in series to be connected to a base electrode of a triode Q2, an emitter electrode of the triode Q2 is connected to the 5 V voltage, a collector electrode of the triode Q2 is connected to a resistor R14 and a resistor R15 in series to be connected to a thyristor K1, the thyristor K1 is connected to a resistor R16 in series to be connected to a load LD, a pin 6 of the microprocessor chip U2 is connected to a resistor R17 in series to be connected to a base electrode of a triode Q3, an emitter electrode of the triode Q3 is connected to a resistor R18 and a capacitor C11 which are connected in parallel to be connected to the 5 V voltage, a collector electrode of the triode Q3 is connected to a resistor R19 and a resistor R20 in series to be connected to the switch S2, the switch S2 is connected to a resistor R7 and a resistor R8 in series to be connected to the 5 V voltage and a resistor R6, the resistor R6 is connected to a light-emitting diode D3 and a light-emitting diode D4 separately, a pin 7 of the microprocessor chip U2 is connected to a resistor R21 in series to be connected to a base electrode of a triode Q4, an emitter electrode of the triode Q4 is connected to the 5 V voltage, a collector electrode of the triode Q4 is connected to a resistor R25 and a resistor R26 in series to be connected to a base electrode of a triode Q5, a collector electrode of the triode Q5 is connected to a resistor R23, and the resistor R23 is connected to two ends of the thyristor K2 in parallel.

* * * * *